United States Patent [19]

Lange et al.

[11] 4,436,757

[45] Mar. 13, 1984

[54] CRYOGENIC PROCESS FOR DECORTICATION AND HULLING OF SUNFLOWER SEEDS

[75] Inventors: Donald A. Lange, Brooklyn Park; Marc C. Hanson, St. Louis Park; Kenneth J. Kriva, Minneapolis, all of Minn.

[73] Assignee: General Mills, Inc., Minneapolis, Minn.

[21] Appl. No.: 415,203

[22] Filed: Sep. 7, 1982

[51] Int. Cl.³ .......................... A23L 1/212; A23L 1/36
[52] U.S. Cl. ................................... 426/438; 426/482; 426/507; 426/524
[58] Field of Search ............... 426/288, 482, 524, 507, 426/511, 438, 615, 629, 481, 630, 634, 444; 62/65; 99/517, 518, 525, 534, 570, 600, 601

[56] References Cited

U.S. PATENT DOCUMENTS

| | | | |
|---|---|---|---|
| 2,379,677 | 7/1945 | Borsakovsky | 426/507 X |
| 3,966,981 | 6/1976 | Schultz | 426/524 X |
| 4,031,253 | 6/1977 | Suortti et al. | 426/482 |

FOREIGN PATENT DOCUMENTS 2450067  10/1980  France ................................. 99/517

OTHER PUBLICATIONS

Stramiero, "Novel Freeze-Enzyme Technique Peels Tomatoes at 6 Tons/Hr.", *Food Engineering*, 10/56, pp. 58, 59 & 141, 426-482.

Brown et al., "Freeze Peeling Improves Quality of Tomatoes", *Journal of Food Science*, vol. 35, 1970, pp. 485-488, 426-482.

*Primary Examiner*—Arthur L. Corbin
*Attorney, Agent, or Firm*—Gene O. Enockson; John A. O'Toole

[57] ABSTRACT

Disclosed are methods for decorticating and for hulling sunflower seeds with cryogenic liquid gases such as liquid nitrogen. The sunflower seeds are immersed in the liquid gas for up to an hour to allow for diffusion of the gas into the seeds. Thereafter, the infused sunflower seeds are immediately and rapidly heated such as by immersion into a water or hot oil bath. The gas vaporization and the severe thermal stress cause the hulls to split off the seed meats. The bath readily separates meats from hulls and seeds. Yields of hulled seeds can reach up to 60%. The process is useful for both confectionery and oilseed varieties of sunflower.

15 Claims, No Drawings

CRYOGENIC PROCESS FOR DECORTICATION AND HULLING OF SUNFLOWER SEEDS

BACKGROUND OF THE INVENTION

1. Technical Field of the Invention

The present invention relates to food products and their methods of preparation. More particularly, the present invention relates to sunflower seeds and to methods of hulling sunflower seeds involving contact with liquid gases at cryogenic temperatures.

2. The Prior Art

As is common in the industry, the term "sunflower" in the singular form is used herein synonymously to refer to sunflower seeds in a manner similar to "wheat" and "barley." Two types of sunflower are grown: (1) those for oilseed production, and (2) those for nut and bird food markets or non-oil sunflower. The oilseed varieties generally are black-seeded and have a thin hull that adheres tenaciously to the kernel. Seeds of the oilseed variety contain from 38% to 50% oil and about 20% protein. Non-oil sunflower also have been referred to as "confectionery" and also as "striped" or "large seeded" varieties. They generally have striped seeds and a relatively thick hull which is loosely attached to the kernel, permitting more complete decortication. Seeds of the non-oil varieties generally are larger than those of the oilseed types and have a lower oil content and test weight.

The term "decorticated" is used in its conventional sense in the sunflower industry to refer to the breaking or loosening of the shells from the seed meats to form a mixture of hulls and meats. The term "hulling" refers to separating the mixture into a hull fraction and meat fraction. Both confectionery and oilseed sunflower are typically mechanically decorticated and hulled in apparatus of basically two types: (1) percussion; i.e., the splitting of seeds by high speed impact, or (2) friction; i.e., the rubbing of seeds between two furrowed discs. Conventional mechanical sunflower decortication and hulling processes suffer from certain disadvantages. Milling plants are capital intensive. Moreover, milling frequently damages the sunflower meats. Also, mechanical decortication techniques do not insure complete removal of hull material from all seed meats.

While the problems and disadvantages of conventional mechanical decortication and hulling are common to both oilseed and confectionery varieties, oilseed sunflower is more difficult to process since the hull is bound more tightly to the seed than in confectionery sunflower. The problems associated with the more tightly bound shells are even more severe with the higher oil percentage hybrids. Oilseeds have nominal hull contents of 24–27% (by weight). While complete hulling would be desirable, conventional domestic oil expression processors typically find economical the removal of only about one third to two thirds of the hulls. Seed meats, hulls, and seeds tend to get broken into many pieces making separation or hulling difficult and therefore expensive beyond the above-indicated range. A significant amount of hull remains attached to meats as small silvers of fiber. Incomplete hulling also results in significant amounts of the wax layer intermediate the meat and hull undesirably entering the expressed oil. The wax is subsequently removed in conventional processing by, e.g., winterization, to provide a dewaxed oil of greater refrigerated stability.

Certain of the above limitations of mechanical milling are shared with certain other grains. Accordingly, the art has long sought non-mechanical methods to supplant or to improve mechanical milling of cereal grains and seeds. Thus, for example, various cereal grains have been treated, usually at elevated temperatures, with dilute sulfuric or hydrochloric acid solutions (U.S. Pat. No. 3,610,305, issued Oct. 5, 1971 to M. Suekane) or hydrogen peroxide (U.S. Pat. No. 3,520,340, issued July 14, 1970 to Y. Takeuchi) or lye (U.S. Pat. No. 3,358,723, issued Dec. 19, 1967 to R. P. Graham et al.) for hulling purposes. None of these methods have found widespread acceptance because of their numerous disadvantages such as requiring extended contact times, damage to or contamination of the seed meats or marginal utility. Mechanical milling of seed materials, and particularly including sunflower, remains the common hulling technique.

Applicants have discovered a surprisingly simple, quick and effective method of decorticating and hulling which is uniquely useful, it is believed, to sunflower. The presently discovered process involves infusing sunflower with a cryogenic liquid gas and thereafter heating the infused sunflower by contacting with a higher temperature heating medium. Of course, the brittleness of materials chilled to well below their glass transition temperatures with cryogenic gases is well known. However, it is highly surprising that sunflower can be uniquely treated to remove the shells from the seed meat without significant breakage of the seeds into nondecorticated pieces and without incurring the disadvantages of previous mechanical and non-mechanical hulling techniques. Unexpectedly, both oilseed and confectionery sunflower can be decorticated and hulled by the process of the present invention notwithstanding the known difficulty in decorticating and hulling the oilseed variety. Surprisingly, the hull splits cleanly into two halves which makes conventional downstream separation between the meats and hulls easier.

Furthermore, applicants have surprisingly discovered that the present process also removes the undesirable wax-like covering of the sunflower meat which tends to stay attached to loosened hulls. Generally, if performed at all, separate mechanical milling techniques have been used to remove or to "dewax" sunflower meats.

Cryogenic freezing, of course, has been used to freeze food products, both bulk and packaged. (See, generally, "Cryogenics," Encyclopedia of Food Science, ed. by M. S. Peterson and A. H. Johnson, The Avi Publishing Company, Inc., 1978, pg. 198–200). Carbon dioxide snow has been used to quick freeze food products in liquid or paste form. (U.S. Pat. No. 4,265,921, issued May 5, 1981 to A. Lermuzeaux). Recently, liquid gas, especially carbon dioxide, although not necessarily at cryogenic temperatures, has been used to decaffeinate coffee beans or to extract residual hexane from defatted soybeans (U.S. Pat. No. 3,966,981, issued June 29, 1976 to W. G. Schultz). Liquid nitrogen is the most commonly used cryogenic freezant. Liquid nitrogen food freezers are commercially available and generally operate by spraying or dribbling the liquid gas on the product, or alternatively, very cold vapor is passed over the product. None of the current commercial liquid nitrogen freezers employ the common laboratory practice of totally immersing a product for rapid cooling, e.g., a few seconds. Moreover, cryogenic cooling techniques are usually employed only with products which cannot be stored long at higher temperatures unlike grains or sunflower.

SUMMARY OF THE INVENTION

The present invention relates to processes for decorticating and hulling sunflower employing cryogenic liquid gases. The method comprises the step of contacting unshelled sunflower with a cryogenic liquid gas. The liquid gas is allowed to diffuse into the seed for a period of from about 1 to 60 minutes to form infused seeds. Thereafter, the infused seeds are contacted with a medium at least 100° F. warmer than the boiling temperature of the gas. With the thermal stress and as the gas vaporizes, a fraction of the seeds are decorticated and hulled simultaneously. Thereafter, the decorticated seeds are then separated from the seed hulls and the fraction of seeds which are not decorticated.

DETAILED DESCRIPTION OF THE INVENTION

The present invention relates to processes for the decortication and hulling of sunflower employing cryogenically cooled liquid gases. The process of the present invention can comprise immersing the unshelled sunflower in a bath of cryogenically cooled liquid gas for a period of time sufficient for the infusion or diffusion or "penetration" herein of the liquid gas into the sunflower. It has been found that actual contact of the cryogenic fluid with the sunflower is important to the surprising results of the present invention as opposed to merely reducing the temperature of the sunflower to the cryogenic temperatures. Mere immersion for cooling purposes, e.g., a few seconds, is insufficient. Typical infusion times range from about 1 to 60 minutes. Better results in terms of higher yields are obtained when the contact times between the cryogenic liquid gas and the sunflower range from about 20 to 40 minutes.

Suitable cryogenic liquid gases include, for example, liquid nitrogen, oxygen, liquid air, argon, hydrogen, neon, helium, or carbon dioxide. If carbon dioxide is employed as the cryogenically cooled liquid gas, the contacting or immersion step is practiced under pressure typically ranging from about 5 to 10 atmospheres (500 to 1000kPa.). Preferred cryogenic liquid gases for use herein include nitrogen, oxygen, and carbon dioxide. Liquid nitrogen is the most highly preferred cryogenic liquid due to its ready availability, relative low cost, safety and does not require pressurized apparatus for the practicing of the present invention. While not critical to the operation of the present process, gas consumption is about 0.7 g. of gas per gram of sunflower treated. Recovery and recompression of the gas can be practiced for greater economy.

A slight rise in yield is observed with increasing size of sunflower. Thus, if desired, a prescreening step to remove seeds small enough to pass through a No. 7 United States Standard Sieve (about 3 mm.) can be employed to increase the yield of decorticated and hulled sunflower herein.

Commonly, sunflower is infected with various insect pests. Certain of these burrow through the hull forming one or more bores. It has been surprisingly found that adulterated sunflower cannot be successfully hulled by the present method. Thus, to increase the yield of the present invention and to decrease the consumption of the liquid cryogenic gas employed, it is highly preferred to insure that the sunflower treated contains minimal amounts of such adulterated sunflower. On a small scale, physical visual inspection and removal of adulterated sunflower is possible. In some commerical operations, careful inspection and spot sampling could be used to provide such higher quality sunflower feed to the present process and such feed is referred to herein as "inspected sunflower."

After the sunflower has been removed from the cryogenic liquid gas, the infused seeds are immediately thereafter contacted with a medium at least 100° F. warmer than the boiling temperature of the gas. While not wishing to be bound to the proposed theory, it is speculated herein that the gas rapidly vaporizes, popping or puffing off the hulls or shells. It is further speculated that the severe thermal stress experienced by the seed may contribute to the effectiveness of the primary mechanism (rapid vaporization of infused liquid gas). It has been found that the heat transfer rate is favorably influenced by the temperature differential between the boiling point of the cryogenic liquid gas and the temperature of the contacting medium. Good results are obtained when the temperature differential is at least about 100° F., preferably at least about 200° F. and, most preferably in excess of 300° F.

In the most preferred embodiment, the infused seeds are immersed into a water bath. While the temperature of the water bath is not critical, warmer water baths, e.g., 110° F. to 180° F. are preferred. Water baths provide the advantage of high heat transfer coefficient of water which modestly influences the yield. Additionally, it has been surprisingly found that immersion into the water bath provides an especially effective means for separating the sunflower meats from the hull residue and nondecorticated seeds both of which float to the surface of the water bath due to density differences. The hull residue and nondecorticated sunflower can be skimmed off to thereby separate them from the hulled sunflower meats. The hull residue can be readily separated from the nondecorticated sunflower by any appropriate means including, for example, conventional air classification which also takes advantage of the density differences in the materials. The meats, which sink, can be separated from the water bath by any conventional means, e.g., screening.

In another embodiment of the present invention, the heating medium can be an oil, for example, mineral oil, coconut oil, soybean oil, safflower oil, sunflower oil, cottonseed oil, peanut oil or mixtures thereof. If the heating medium is an oil, it is preferred that the oil be an edible oil so as to obviate the necessity of removing the nonedible oil from the meats. Additionally, since the heat transfer coefficient of oil is not as high as that for water, it is desired that the temperature differential be as high as practicable, i.e., up to about below the smoke point of the oil. For example, coconut oil can be heated to 300°–380° F., preferably about 350° F. When used herein, while useful, employment of lighter density materials, such as edible oils, as the heating medium, makes the separation of the sunflower meats from the hull residue and nondecorticated sunflower slightly more difficult.

Still other heating mediums can be successfully employed. For example, the infused seeds may be charged to a vessel heated by steam, such as low pressure, e.g., 15 psig. steam, e.g., a pressurized tank. Suitable apparatus and techniques for such a heating operation are disclosed in, for example, U.S. Pat. No. 3,754,926 (issued July 18, 1973 to Strommer et al.); U.S. Pat. No. 3,707,380 (issued Dec. 26, 1972 to Dunning et al.); U.S.

Pat. No. 3,955,486 (issued May 11, 1976 to Strommer); and U.S. Pat. No. 3,915,081 (issued Oct. 28, 1975 to Flackne). Each of these patents are incorporated herein by reference. Generally, these patents disclose apparatus for the high pressure and/or temperature treatment of particulates with gases, particularly steam, comprising a gas source, rotary inlet feed valves for the gas and particulates, elongated treatment zones and various discharge nozzles or valves.

Yields of decorticated and hulled seeds of up to as high as about 60% have been achieved. The remaining 40% are comprised of partially hulled seeds and unhulled seeds. If desired, the fractions which were not hulled may be re-treated by repeating the present process or may be milled. Yields, however, of re-treated hulled meats are only on the order of about 10%. An advantage, however, of the present invention is that even the unhulled or nondecorticated sunflower have had their hulls loosened and are decorticated and hulled more easily by conventional mechanical milling techniques. The undecorticated, cryo-treated sunflower is thus referred to herein as "cryo-loosened" sunflower. Unlike conventional sunflower, cryo-loosened sunflower can be easily split in hand with a fingernail.

The present invention has particular usefulness for decortication and hulling of oilseed sunflower varieties. Oilseed varieties are especially difficult to process cleanly and therefore have been considered to be unsuitable for confectionery uses. Accordingly, one advantage of the present invention is that it provides a process for processing oilseed sunflower varieties which realize sunflower meats which are nonetheless useful for confectionery purposes. Both confectionery and oilseed varieties when conventionally hulled have serious stability problems once they have been oil roasted or dry roasted. The causes of the stability problems are not well understood except that any split hulls, unremoved fiber or waxy layer between hull and seed which remain with the meats seem to adversely affect stability. The present cryogenic process can decorticate and hull oilseed varieties producing meats much cleaner and with much less damage than prior art processes. It appears in the present process that the waxy layer stays with the hulls leading possibly to increased product stability.

In still another embodiment of the present invention, the inability of the present invention to hull adulterated seeds referred to above can most surprisingly be used to upgrade partially adulterated sunflower by separating fit, hulled sunflower meats from unhulled, unfit sunflower. As indicated above, sunflower is often infested with various insect pests. While adulteration is clearly also undesirable with oilseed varieties, oilseed sunflower can generally still be processed and clean oils produced therefrom. With confectionery sunflower, however, even small percentages of adulterated sunflower render the entire mixture of unadulerated and adulterated sunflower unfit for human consumption since large scale separation techniques are not available. In this embodiment of the present invention, the mixture of unadulterated and adulterated seeds are processed by the present method. Since the adulterated seeds are not hulled, the present process uniquely and unexpectedly "rejects" seeds rendered unfit by insects. The rejected seeds are easily removed from the hulled meat along with the hull shells, chaff, etc. by the water or oil bath. Thus, the present invention provides an unexpected and surprisingly effective method for upgrading unfit sunflower.

While the precise phenomenon is not clearly understood, it appears that the present invention can be practiced only with sunflower. Attempts at similarly processing such hulled varieties as wheat and oats have not proven successful.

The following examples are offered for purposes of illustration of the present invention.

EXAMPLE I

A sample of oilseed inspected sunflower was screened to provide seeds through No. 5 U.S. Standard size sieve (sieve opening 4 mm.) and on a No. 6 (sieve opening 3.36 mm.). About 95 g. of the sunflower were immersed in an open boiling liquid nitrogen bath. After about 30 minutes the sunflower were removed from the nitrogen bath and immediately immersed in a bath of room temperature water. About 43% of the seeds popped the hull off of the seed meats. Another sample of about 105 g. was immersed in the liquid nitrogen bath for 60 minutes before immersion in the water bath. The yield of hulled sunflower was about 45%. The nondecorticated fraction and hulls were skimmed off the surface of the water bath. The hulled meats were recovered from the water bath by simple screening. The hulled meats were visually observed to be free of the waxy layer.

EXAMPLE II

To investigate the relationship of seed size on yield, inspected samples of oilseed sunflower of various sizes were each immersed separately in an open boiling liquid nitrogen bath for 30 minutes and thereafter warmed in a room temperature water bath to yield hulled seed meats. The results of such testing are as follows:

| Amount | Size | Yield |
| --- | --- | --- |
| 50 g. | Through No. 4, on No. 5 | 37% |
| 90 g. | Through No. 5, on No. 6 | 33% |
| 70 g. | Through No. 6, on No. 7 | 14% |

Thus, while the process was effective on smaller seed sizes, the yield of hulled sunflower increased with increasing size.

EXAMPLE III

To investigate the usefulness of another cryogenic gas, about 19 g. of inspected oilseed (through No. 5, on No. 6) were charged to a two liter pressure vessel nearly filled with chunk dry ice ($-109°$ F., $-78°$ C.) and pressurized to about 10 atmospheres (apx. 1013kPa.) which allowed for the adiabatic liquifaction of the carbon dioxide. The pressurized vessel was packed in dry ice to maintain a constant temperature. After 30 minutes, the vessel was depressurized and the seeds put into a room temperature water bath. The yield of hulled seeds was about 26%.

EXAMPLE IV

To investigate the ability to self-select only seeds free from insect damage, a 300 g. sample determined to contain 29% (by weight) insect adulterated seeds was processed by the methods described. Over one third of the seeds popped their hulls off to yield decorticated and hulled seed meats. Greater than 99.5% of those that were hulled were free of insect damage.

What is claimed is:

1. A process for decorticating and hulling sunflower seeds, comprising the steps of:
   A. contacting unshelled sunflower seeds with a cryogenic liquid gas for a time sufficient to allow penetration of the liquid gas into the seeds to form infused seeds, and immediately thereafter,
   B. contacting the cryogenically infused seeds with a liquid or aqueous heating medium at least about 100° F. warmer than the boiling temperature of the gas to vaporize the gas and thermally stress the seed hulls whereby a fraction of the seeds are decorticated and hulled, thereby forming a mixture of hulled meats, hull fragments, partially decorticated seeds and nondecorticated seeds, and then
   C. separating the hulled meats from the mixture.

2. The process of claim 1 wherein the unshelled sunflower seeds are immersed in a bath of the liquid gas for a time of from about 1 to 60 minutes.

3. The process of claim 2 wherein the liquid gas is selected from the group consisting of liquid carbon dioxide, liquid nitrogen, and liquid oxygen.

4. The process of claim 3 wherein the heating medium is water and the infused seeds are immersed in the heating medium.

5. The process of claim 4 additionally comprising the step of sizing the unshelled sunflower seeds prior to contacting with the liquid gas to remove seeds small enough to pass through a U.S. Standard Size 7 mesh screen.

6. The method of claim 5 additionally comprising the steps of:
   D. separating the partially decorticated seeds and nondecorticated seeds from the mixture to form a fraction of unshelled sunflower seeds, and then
   E. repeating steps A through C.

7. The process of claim 6 wherein the sunflower seeds are an oilseed variety.

8. The process of claim 5 wherein the sunflower seeds are a confectionery variety.

9. The process of claim 5 additionally comprising the steps of
   F. separating the partially decorticated seeds and nondecorticated seeds from the mixture, and thereafter
   G. milling the seeds.

10. The process of claim 3 wherein the heating medium is an edible fatty liquid triglyceride.

11. The process of claim 10 wherein the liquid triglyceride is heated to a temperature less than its smoke point temperature.

12. The process of claim 10 wherein the triglyceride is a member selected from the group consisting of soybean oil, cottonseed oil, peanut oil, coconut oil, sunflower seed oil and mixtures thereof.

13. The process of claim 12 wherein the member is coconut oil and has a temperature of from about 300° F. to 380° F.

14. The process of claim 3 wherein the heating medium is steam.

15. A method for upgrading partially adulterated sunflower seeds, comprising the steps of:
   A. contacting unshelled sunflower seeds comprising a mixture of unadulterated sunflower seeds and adulterated sunflower seeds with a cryogenic liquid gas for a time sufficient to allow penetration of the liquid gas into the seeds to form infused seeds, and immediately thereafter,
   B. contacting the infused seeds with a liquid or aqueous heating medium at least about 100° F. warmer than the boiling temperature of the gas to vaporize the gas and thermally stress the seed hulls whereby a fraction of the unadulterated seeds are decorticated and hulled thereby forming a mixture of hulled and unadulterated meats, hull fragments, partially decorticated unadulterated seeds and undecorticated seeds including the adulterated seeds, and then
   C. separating the hulled and unadulterated meats from the mixture.

* * * * *